(12) United States Patent
Gonidec et al.

(10) Patent No.: US 11,926,409 B2
(45) Date of Patent: Mar. 12, 2024

(54) PROPULSIVE ASSEMBLY, IN PARTICULAR FOR AN AIRCRAFT, FOR PROTECTION AGAINST AN UNBALANCE FORCE AND METHOD OF PROTECTION

(71) Applicant: SAFRAN NACELLES, Gonfreville-l'Orcher (FR)

(72) Inventors: Patrick Gonidec, Moissy Cramayal (FR); Loic Chapelain, Moissy Cramayal (FR); Xavier Carcenac, Moissy Cramayal (FR); Vincent Lefeuvre, Moissy Cramayal (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/725,453

(22) Filed: Apr. 20, 2022

(65) Prior Publication Data

US 2022/0348314 A1    Nov. 3, 2022

(30) Foreign Application Priority Data

Apr. 21, 2021    (FR) ...................................... 2104170

(51) Int. Cl.
   *B64C 17/00*     (2006.01)
   *B64C 11/00*     (2006.01)
   *B64D 27/26*     (2006.01)

(52) U.S. Cl.
   CPC .............. *B64C 17/00* (2013.01); *B64C 11/00* (2013.01); *B64D 27/26* (2013.01); *B64D 2027/262* (2013.01)

(58) Field of Classification Search
   CPC .... B64D 27/26; B64D 2027/262; B64B 1/36; B64B 1/30; B64B 1/32; B64B 1/34
   See application file for complete search history.

(56) References Cited

U.S. PATENT DOCUMENTS 1,842,125 A * 1/1932 Schwarz .................. B63H 7/02
                                                                                              244/51
5,449,129 A * 9/1995 Carlile ...................... B64B 1/24
                                                                                              244/55

(Continued)

FOREIGN PATENT DOCUMENTS

| DE | 10 2007 013147 A1 | 9/2008 |
|---|---|---|
| EP | 0948441 A2 | 10/1999 |
| EP | 1972781 A2 | 9/2008 |

OTHER PUBLICATIONS

Search Report from the French Intellectual Property Office on corresponding FR application (FR2104170) dated Dec. 1, 2021.

*Primary Examiner* — Timothy D Collins
*Assistant Examiner* — Justin Michael Heston
(74) *Attorney, Agent, or Firm* — KOS IP Law LLP

(57) ABSTRACT

A propulsive assembly, in particular for an aircraft, comprising a mast and a propulsion device comprising an engine and a nacelle, the engine comprising a propeller, the propulsive assembly comprising:

A standby protection device comprising a first connecting member fixedly mounted to the mast and a second connecting member fixedly mounted to the propulsion device, the second connecting member being rotatably hinged with respect to the first connecting member in at least one degree of freedom, and at least one retaining member keeping the second connecting member fixed with respect to the first connecting member, and configured, in the presence of a predetermined unbalance force on the propeller, to release the standby protection device in order to protect the mast.

18 Claims, 6 Drawing Sheets

(56) References Cited

U.S. PATENT DOCUMENTS

| | | |
|---|---|---|
| 8,062,082 B1 | 11/2011 | Anderson et al. |
| 2011/0198438 A1* | 8/2011 | Colting .................... B64B 1/34 244/30 |
| 2018/0327102 A1 | 11/2018 | Couffignal et al. |
| 2020/0130798 A1 | 4/2020 | Despineux et al. |

* cited by examiner

PROPULSIVE ASSEMBLY, IN PARTICULAR FOR AN AIRCRAFT, FOR PROTECTION AGAINST AN UNBALANCE FORCE AND METHOD OF PROTECTION

TECHNICAL FIELD

The present invention relates to the field of propulsive assemblies, in particular for an aircraft, and is intended to protect an engine support mast against an unbalance force.

Figure 1:
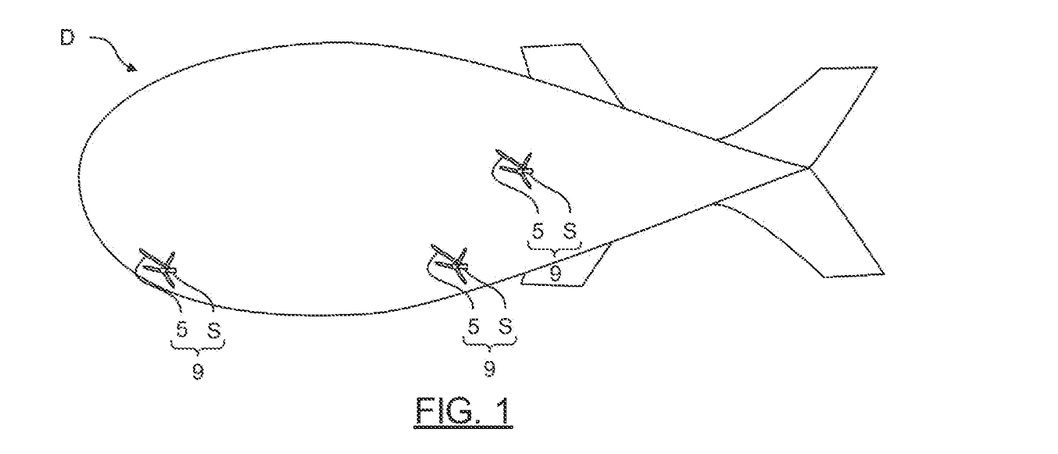
FIG. 1 is a schematic perspective representation of an airship.

In a known manner, with reference to FIG. 1, an airship D comprises a carrying structure to which several propulsive assemblies 9 are mounted. Each propulsive assembly 9 comprises a mast 5 and a propulsion device S, supported by the mast 5, which comprises an engine and a nacelle wrapping the engine. The engine is typically in the form of a turboprop engine or an electric motor and comprises a propeller, which may or may not be ducted. The engine rotatably drives the propeller along an axis of rotation, in order to accelerate the air and ensure propulsion or stabilization at the fixed point of the airship D. The mast 5 is in turn attached to the carrying structure of the airship D to transmit the thrust provided by the propeller. Conventionally, the mast 5 takes the form of a slender, especially tubular, structure, extending perpendicular to the axis of rotation of the propeller.

In practice, it is necessary to provide a mast 5 of great length to space the propeller apart from the carrying structure of the airship D. The circumference of the mast 5 has moreover to be small in order to limit the drag generated and the weight carried. The drawback of such a mast 5 is that it is likely to be weakened if one of the propeller blades is lost, for example during contact with a bird. The loss of a blade generates an unbalance which causes the propeller to oscillate about its axis of rotation. Such oscillations can, in some cases, weaken the ends of the mast 5 and have to be avoided.

To eliminate this drawback, it is known in the field of airplanes to integrate several dampers into the nacelle to dampen oscillations between the engine propeller and the airplane mast. Nevertheless, such dampers need to be installed on a mast of a large cross-section area to allow positioning of the dampers at the interface between the mast and the turboshaft engine. Moreover, such dampers are effective for a mast of short length and high rigidity and are therefore not adapted to be integrated onto a mast 5 of an airship D.

The invention thus aims to effectively protect the mast of an airship, and more generally of any aircraft, from an unbalance force on the engine, while preserving performance of the aircraft.

SUMMARY

The invention relates to a propulsive assembly, in particular for an aircraft, comprising a mast and a propulsion device supported by the mast, said propulsion device comprising an engine and a nacelle wrapping the engine, said engine comprising a propeller rotatable along a rotation axis driven by the engine.

The invention is remarkable in that the propulsive assembly comprises:
  A standby protection device comprising a first connecting member fixedly mounted to the mast and a second connecting member fixedly mounted to the propulsion device, the second connecting member being rotatably hinged with respect to the first connecting member in at least one degree of freedom, and at least one retaining member keeping the second connecting member fixed with respect to the first connecting member, said retaining member being configured, in the presence of a predetermined unbalance force on the propeller, to release the standby protection device in order to protect the mast.

By virtue of the invention, the mast of the propulsive assembly is protected in the presence of an unbalance force on the propeller, while preserving performance of the propulsive assembly, especially in terms of aerodynamics and on-board weight. This improves mechanical strength of the mast so as to resist effectively in the event of loss of blade on the propeller, especially in the event of contact with a bird. More precisely, the standby protection device allows, when released, to allow one or more degrees of freedom in rotation between the mast and the propulsion device. In the presence of an unbalance force on the propeller, oscillations generated at the engine and nacelle are thus not transmitted to the mast. In the absence of an unbalance force, the retaining member keeps the standby protection device fixed, so as to form a fixed connection as in prior art. Such a standby protection device is in particular adapted for a mast of great length and small circumference, to which dampers cannot be mounted, such as the mast of an airship.

According to one aspect of the invention, the second connecting member is fixedly mounted to the nacelle of the propulsion device for optimal mechanical strength and easy assembly.

According to one aspect of the invention, the second connecting member is rotatably hinged with respect to the first connecting member in at least two degrees of freedom, preferably in only two degrees of freedom. This effectively prevents transmission of forces between the propulsion device and the mast when the propeller is subjected to an unbalance force.

According to one aspect of the invention, the standby protection device comprises an interface member mounted between the first connecting member and the second connecting member, said interface member being pivotally mounted with respect to the first connecting member in one of the degrees of freedom, said second connecting member being pivotally mounted with respect to the interface member in another of the degrees of freedom. Such an interface member advantageously allows pivoting in two different degrees of freedom, in a simple and robust manner.

According to one aspect of the invention, one degree of freedom is in the form of a rotation about the longitudinal axis of the mast. Such a degree of freedom makes it possible to absorb significant part of oscillations generated by an unbalance on the propeller.

According to one aspect of the invention, a degree of freedom takes the form of a rotation about a transverse axis, which defines a reference frame orthogonal to the axis of rotation of the propeller and the longitudinal axis of the mast. Such a degree of freedom makes it possible to absorb significant part of oscillations generated by an unbalance on the propeller. Together, the two degrees of freedom effectively reduce forces induced by the oscillations generated by an unbalance on the propeller during a blade loss.

According to one preferred aspect of the invention, the interface member is pivotally mounted with respect to the first connecting member about the longitudinal axis, in a simple and robust manner.

According to one preferred aspect of the invention, the second connecting member is pivotally mounted with respect to the interface member about the transverse axis, in a simple and robust manner.

According to one preferred aspect of the invention, the retaining member is the only one. A single retaining member thus allows the standby protection device to be released, simply and quickly, as soon as the predetermined unbalance force appears. The retaining member on its own especially makes it possible to simultaneously release both degrees of freedom of the standby protection device.

According to one aspect of the invention, the retaining member is configured to passively release the protection device under the action of the predetermined unbalance force, preferably by breaking. No human intervention is required to release the standby protection device. The retaining device thus enables the standby protection device to be released quickly and easily as soon as the unbalance occurs, in particular by shear breaking. This makes it possible to protect the mast without a delay during which it could be weakened.

According to one preferred aspect of the invention, the retaining member is in the form of a pin. Such a retaining member is simple, economical and especially adapted for shear breaking in order to release the standby protection device.

According to one preferred aspect, the retaining member is configured to release the protection device by movement, preferably passively under the action of the predetermined unbalance force. The retaining member thus allows the standby protection device to be released quickly and easily as soon as the unbalance occurs, in particular by retraction. This makes it possible to protect the mast without a delay during which it could be weakened.

According to one preferred aspect of the invention, the retaining member comprises a spring-loaded plunger and/or a magnet for moving a ball between an extended position and a retracted position, the movement of which makes it possible to block or release the standby protection device.

According to one aspect of the invention, the standby protection device comprises a first arm integral with the mast and a second arm integral with the propulsion device, the retaining member connecting the first arm and the second arm. This allows, on the one hand, easy and practical mounting of the retaining member, and on the other hand, effective holding of the standby protection device in the absence of unbalance.

According to one preferred aspect of the invention, the standby protection device comprises stop means configured to limit rotation of the second connecting member with respect to the first connecting member to a reduced angular range. This prevents any contact between the propeller and the mast.

According to one aspect of the invention, the mast comprises a slenderness greater than 5, preferably greater than 10. It is set out that the slenderness designates the quotient of the length of the mast to its chord, i.e. the segment connecting the leading edge and the trailing edge of the mast in a plane transverse to the longitudinal axis of the mast. The standby protection device is particularly adapted for a mast of large slenderness, especially of large length and small circumference, for which dampers are ineffective and/or difficult to integrate. According to one aspect of the invention, the mast comprises a circumference substantially less than ⅕ of the length.

According to one preferred aspect of the invention, the mast comprises a rectilinear tubular structure, preferably free of dampers.

The invention also relates to an aircraft comprising a propulsive assembly as described previously, said aircraft preferably being in the form of an airship. An airship actually comprises a mast of great length to keep the propeller away from the carrying structure, as well as a small circumference to limit drag and mass. The standby protection device is thus particularly advantageous in the case of an airship.

The invention further relates to a method for protecting the mast of a propulsive assembly as described previously, wherein the first connecting member and the second connecting member are initially kept fixed by the retaining member, in which method, in the presence of a predetermined unbalance force on the propeller, the retaining member releases the standby protection device in order to protect the mast. The method according to the invention is advantageously simple and quick to implement, preferably passively, preferably by shear breaking of the retaining member when the predetermined unbalance force occurs.

BRIEF DESCRIPTION OF THE DRAWINGS

The invention will be better understood upon reading the following description, given by way of example, and referring to the following figures, given as non-limiting examples, in which identical references are given to similar objects.

It should be noted that the figures set out the invention in detail to implement the invention, said figures of course being able to be used to better define the invention if necessary.

DETAILED DESCRIPTION

Figure 2:
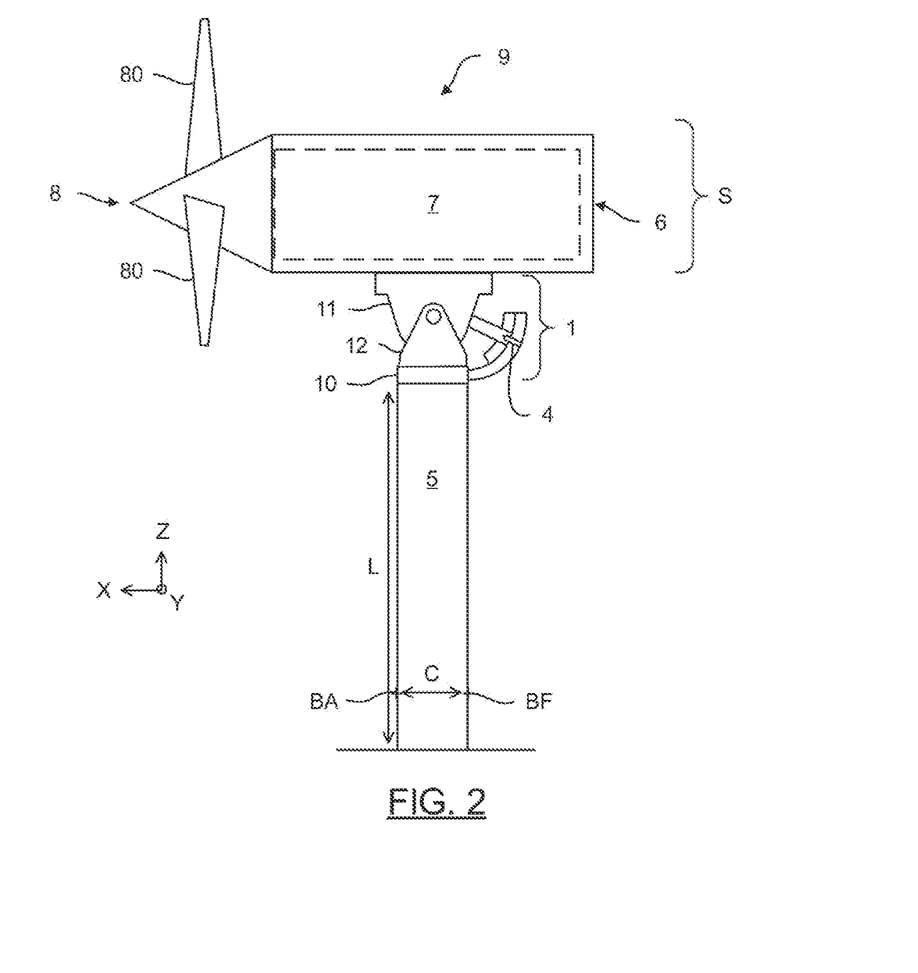
FIG. 2 is a schematic representation in a longitudinal view of an airship propulsive assembly according to one embodiment of the invention.

With reference to FIGS. 1 and 2 and as described in the preamble, an airship D comprises a carrying structure to which are mounted several propulsive assemblies 9. Each propulsive assembly 9 comprises a mast 5 and a propulsion device S, supported by the mast 5, which comprises an engine 7 and a nacelle 6 wrapping the engine 7. The engine 7 is classically in the form of a turboprop engine or an electric motor and comprises a propeller 8, which may or may not be ducted. The engine 7 is used to rotate the propeller 8 along an axis of rotation X, which is preferably parallel to the axis of the airship D, in order to accelerate the air and ensure propulsion or stabilization at the fixed point of the airship D. The mast 5 is in turn attached to the carrying structure of the airship D to transmit thrust provided by the propeller 8. Conventionally, the mast 5 is in the form of a slender, especially tubular, structure, extending perpendicularly to the axis of rotation X of the propeller 8. Hereinafter, Z designates the longitudinal axis of the mast 5 which forms, with the rotation axis X and a transverse axis Y, an orthogonal reference frame X, Y, Z.

According to the invention and as illustrated in FIG. 2, the propulsive assembly 9 further comprises:
- a standby protection device 1 comprising a first connecting member 10 fixedly mounted to the mast 5 and a second connecting member 11 fixedly mounted to the propulsion device S, the second connecting member 11 being rotatably hinged with respect to the first connecting member 10 in one (or more) degree(s) of freedom, and
- a retaining member 4 keeping the second connecting member 11 fixed relative to the first connecting member 10, said retaining member 4 being configured, in the presence of a predetermined unbalance force on the propeller 8, to release the standby protection device 1 in order to protect the mast 5.

Advantageously, the invention makes it possible to protect the mast 5 when an unbalance occurs on the propeller 8, generated especially by the loss of a blade 80 of the propeller 8, during contact with a bird, for example. The invention also makes it possible to preserve performance of the propulsive assembly 9, especially in terms of drag and mass. Such a standby protection device 1 is in particular adapted for a mast 5 of an airship D, which comprises a large length to keep the propeller 8 away from the carrying structure of the airship D as well as a small circumference to limit drag and mass.

The invention is herein set out in the context of an airship D, but it goes without saying that it applies to any propulsive assembly comprising an engine and an engine support mast. The invention applies in particular to an aircraft propulsive assembly, especially for which the mast 5 comprises a great length, a small circumference and the longitudinal axis Z of the mast is substantially perpendicular to the axis of rotation X of the propeller 8. Preferably, the mast 5 comprises a slenderness greater than 5, preferably greater than 10, the slenderness being defined as the quotient of the length L of the mast 5 to its chord C (see FIG. 2). As a reminder, as illustrated in FIG. 2, the chord C designates the distance separating the leading edge BA from the trailing edge BF of the mast 5 in a plane transverse to the longitudinal axis Z of the mast 5. Indeed, for such propulsive assemblies, the integration of dampers is not adapted for reasons of space and efficiency.

Preferably, as described in the following embodiments, the second connecting member 11 is fixedly mounted to the nacelle 6 for optimal mechanical strength and ease of assembly. Alternatively, the second connecting member 11 could also be fixedly mounted to the engine 7 directly. In addition, only one propulsive assembly 9 of an airship D is described below, but it goes without saying that any number of propulsive assemblies 9 of the airship D may be equipped with a standby protection device 1 and a retaining member 4, preferably those likely to come into contact with a bird, preferably all of the propulsive assemblies 9 of the airship D.

The standby protection device 1 and the retaining member 4 are described in greater detail below.

Figure 3:
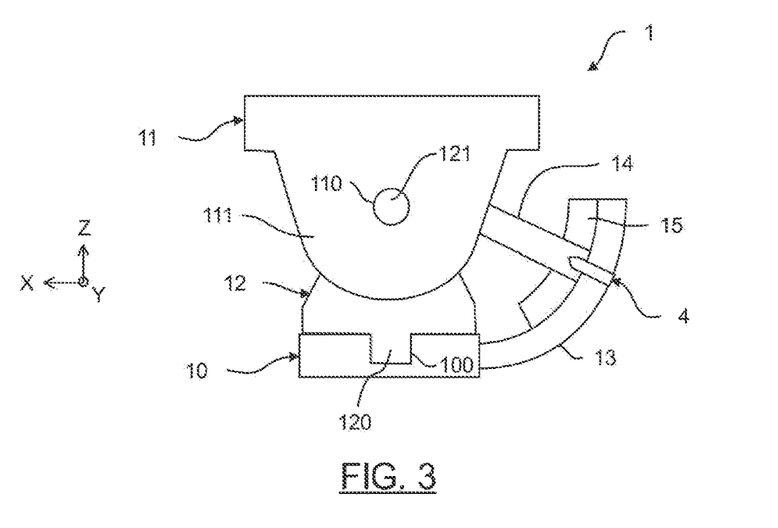
FIG. 3 is a schematic representation in a longitudinal cross-section view of the mast protection device of the aircraft propulsive assembly of FIG. 2.
Figure 4:
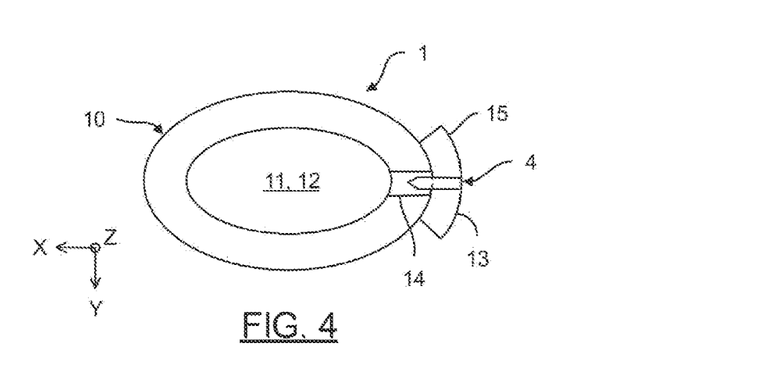
FIG. 4 is a schematic representation in a top view of the mast protection device of FIG. 3.

With reference to FIGS. 3 and 4 and as previously described, the standby protection device 1 comprises a first connecting member 10 fixedly connected to the mast 5 and a second connecting member 11 fixedly connected to the nacelle 6. In this example, the standby protection device 1 also comprises an interface member 12, which is mounted between the first connecting member 10 and the second connecting member 11. The interface member 12 is pivotally mounted along the longitudinal axis Z relative to the first connecting member 10. The second connecting member 11 is in turn pivotally mounted along the transverse axis Y relative to the interface member 12. Thus, the first connecting member 10 and the second connecting member 11 are doubly hinged to each other.

The standby protection device 1 thus offers two degrees of freedom to the nacelle 6 with respect to the mast 5 fixedly mounted to the carrying structure of the airship D: a rotation about the longitudinal axis Z forming a first degree of freedom and a rotation about the transverse axis Y forming a second degree of freedom. In practice, these two degrees of freedom make it possible to absorb large part of oscillations generated in the presence of an unbalance on the propeller 8.

Alternatively, the standby protection device 1 could allow a different number of degrees of freedom, in particular a single degree of freedom among those mentioned, namely a rotation about the longitudinal axis Z or a rotation about the transverse axis Y. Such an alternative makes it possible especially to dispense with an interface member 12 by directly mounting the second connecting member 11 pivoting with respect to the first connecting member 10 according to the degree of freedom chosen. Such an alternative thus limits the mass but confers a more limited protection for the mast 5 with a reduced absorption of unbalance forces.

More precisely, in the example of FIGS. 3 and 4, the interface member 12 and the first connecting member 10 form the male and the female part of the connection respectively. The interface member 12 comprises a central rod 120 projecting along the longitudinal axis Z which cooperates with a central opening 100 of the first connecting member 10, in order to pivot along the longitudinal axis Z. Obviously, the cooperation between the interface member 12 and the first connecting member 10 could be different without departing from the scope of the invention. For example, the interface member 12 and the first connecting member 10 could alternatively form the female and male part of the connection, respectively, as will be seen later.

Still in the example with reference to FIG. 3, the second connecting member 11 is in the form of a yoke and comprises two lugs 111, extending longitudinally along the longitudinal axis Z, each comprising a through opening 110.

The interface member 12 comprises a pivot 121 with a transverse axis Y, each end of which is mounted in a through opening 110 so as to pivot about the latter. The second connecting member 11 and the interface member 12 thus form the female and male parts of the connection respectively. It goes without saying that the cooperation between the second connecting member 11 and the interface member 12 could be different without departing from the scope of the invention. By way of example, the second connecting member 11 and the interface member 12 could alternatively form the male and female part of the connection respectively, as will be seen below.

With reference to FIGS. 3 and 4 and as previously described, the retaining member 4 keeps the second connecting member 11 fixed relative to the first connecting member 10. The retaining member 4 thus retains the protection device 1 in a standby manner so as to form a fixed connection between the nacelle 6 and the mast 5. More precisely, in this example, the retaining member 4 connects a first arm 13 and a second arm 14 of the standby protection device 1. The first arm 13 is fixedly mounted to the first connecting member 10, integrally with the mast 5, while the second arm 14 is fixedly mounted to the second connecting member 11, integrally with the nacelle 6. Still in this example, the first arm 13 extends externally and perpendicularly to the second arm 14. The retaining member 4 is in turn in the form of a pin passing through the thickness of the first arm 13 and extending into the second arm 14.

Figure 5:
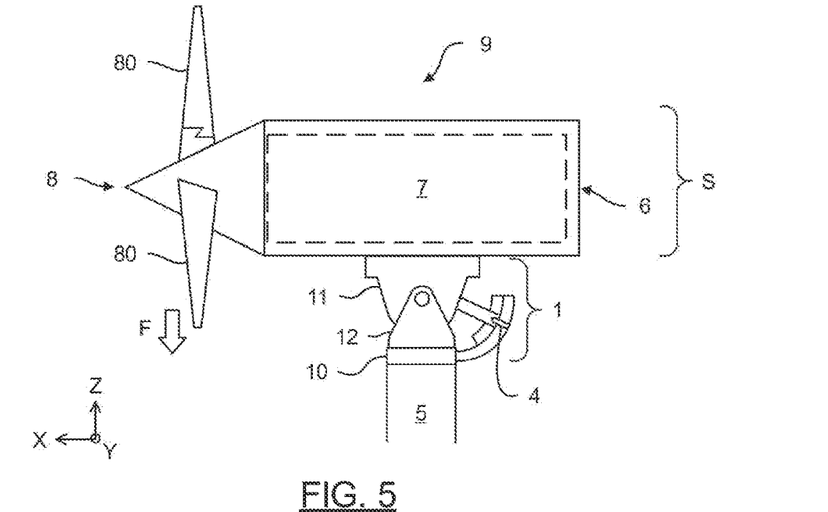
FIG. 5 is a schematic representation in a longitudinal view of the propulsive assembly of FIG. 2 upon implementing the protection method according to one embodiment of the invention.

With reference to FIG. 5 and as previously described, the retaining member 4 is configured to release the standby protection device 1 in the presence of a predetermined unbalance force. Preferably, the retaining member 4 is configured to release the standby protection device 1 passively under the effect of the unbalance force, preferably by breaking. FIG. 5 represents the case of a loss of blade 80 at the propeller 8, which causes an imbalance in the mass distribution on the propeller 8 and generates an unbalance mass. The unbalance mass causes an unbalance force F which tends to move the axis of rotation of the propeller 8 and exerts a shearing force on the retaining member 4, causing it to break. Preferably, the retaining member 4 comprises a favored breaking zone, for example in the form of a slot, a groove or a calibrated section, in order to facilitate its breaking and to choose its location. In the example of FIGS. 3 and 4, the interface between the arms 13, 14 is at least partially spherical at the shear zone of the retaining member 4, so as to be very close, or even in contact, in order to promote shearing of the retaining member 4. The clearance between the arms 13, 14 can be increased at a distance from the shear zone.

It goes without saying that the protection device 1 could be released in different ways by the retaining member 4, either actively or passively, under the effect of the unbalance force without departing from the scope of the invention.

Figure 6:
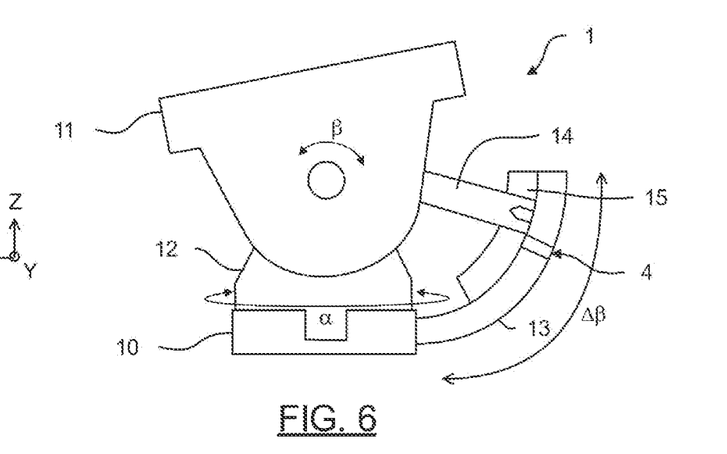
FIG. 6 is a schematic representation in a longitudinal cross-section view of the protection device after implementing the protection method of FIG. 5.
Figure 7:
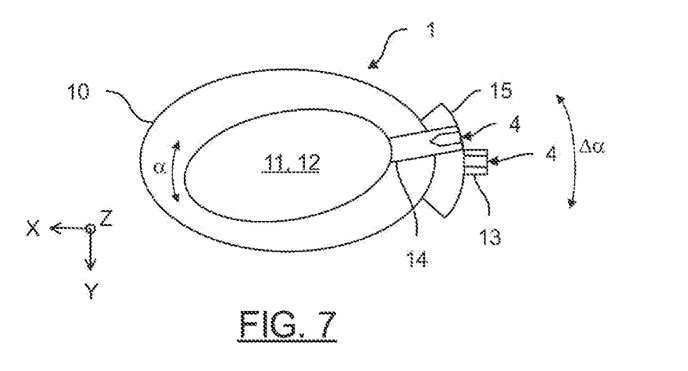
FIG. 7 is a schematic representation in a top view of the protection device after implementing the protection method of FIG. 5.

FIGS. 6 and 7 illustrate the rotational movement of the nacelle 6 relative to the mast 5 once the standby protection device 1 is released. As illustrated in FIGS. 6 and 7, the retaining member 4 is broken so that the first arm 13 and the second arm 14 are no longer integral with each other. The nacelle 6 is thus allowed to rotate relative to the mast 5 under the effect of the unbalance force, in this example with a degree of freedom α in rotation about the longitudinal axis Z and with a degree of freedom β in rotation about the transverse axis Y.

As illustrated in FIGS. 6 and 7, the standby protection device 1 preferably comprises stop means 15 so as to limit the movement of the second connecting member 11 relative to the first connecting member 10, and hence of the nacelle 6 relative to the mast 5. In this example, the stop means 15 are in the form of projecting elements mounted to the first arm 13 on either side of the second arm 14 in order to limit movement of the second arm 14. However, it goes without saying that other stop means 15 could be contemplated. Preferably, the stop means 15 limit movement to a reduced angular range Δα of less than 90° for the degree of freedom α in rotation about the longitudinal axis Z and to a reduced angular range Δβ for the degree of freedom β in rotation about the transverse axis Y, such that the blades 80 of the propeller 8 have no contact with the mast 5.

Preferably, to avoid any collision, the angle formed by the degree of freedom β is strictly less than a maximum angle $β_{max}$ determined by the following formula:

$$\beta_{max} = 2 \cdot Arctg\left(\frac{-Lp + \sqrt{Lp^2 + Lh^2 - e^2}}{e + Lh}\right) \quad \text{[Math. 1]}$$

wherein
Lp is the radius of the propeller,
Lh is the distance between the plane of the propeller and the point O determined at the intersection of the vertical and lateral axes of rotation of the propulsive assembly following its release,
e is the distance between the leading edge and the vertical axis passing through the point O.

Even more preferably, the angles of the degrees of freedom α and β are greater than a predetermined threshold angle β0 which corresponds to the angle of the nacelle 6 unbalanced about its initial axis for a predetermined unbalance.

Preferably, the first connecting member 10, the second connecting member 11, and the interface member 12 are each one-piece, i.e., from a single piece.

Figure 8A:
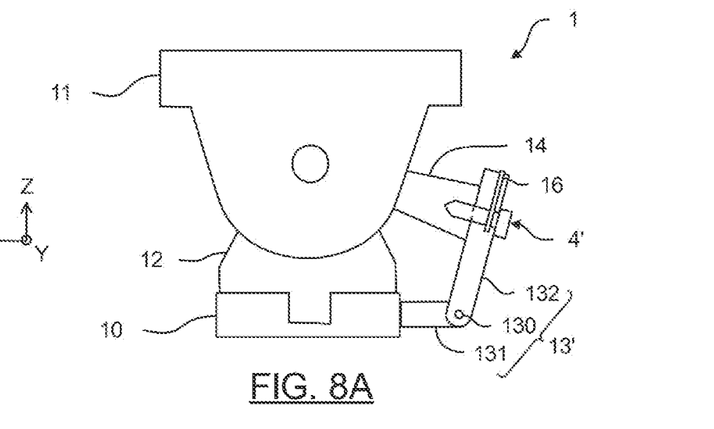
FIG. 8A is a schematic representation in a longitudinal cross-section view of the protection device according to another embodiment of the invention.
Figure 8B:
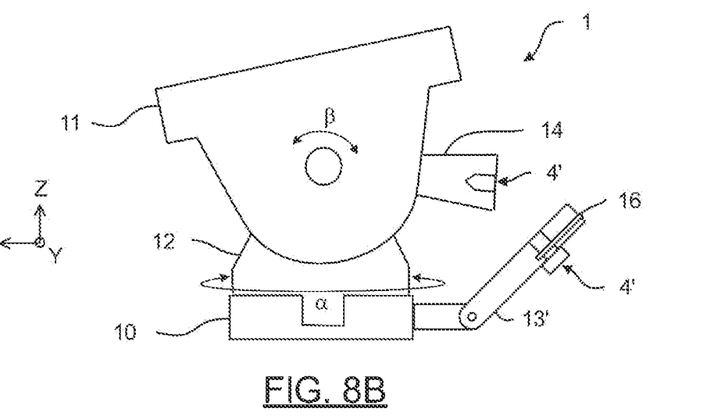
FIG. 8B is a schematic representation in a longitudinal cross-section view of the protection device of FIG. 8A after implementing the protection method of FIG. 5.

Hereinafter, with reference to FIGS. 8A and 8B, another embodiment of the invention is described, which differs from the previous one in that the first arm 13' comprises a joint 130. As illustrated in FIG. 8A, the first arm 13' comprises a proximal portion 131 attached to the first connecting member 10 and a distal portion 132 to which the retaining member 4' is mounted. The distal portion 132 is further pivotally mounted about the transverse axis Y with respect to the proximal portion 131 by virtue of the joint 130. As illustrated in FIG. 8B, advantageously, in the presence of an unbalance, the first arm 13', unsecured from the second arm, 14 pivots outwardly from the standby protection device 1 under the effect of gravity. This makes it possible to move the first arm 13' away from the second arm 14 so as to avoid any hindrance during the movement of the nacelle 6 with respect to the mast 5 in the degrees of freedom α, β.

Still referring to FIGS. 8A and 8B, independently of the first hinged arm 13', the retaining member 4' is in the form of a screw attached using a guide pin 16. With reference to FIG. 8A, the retaining member 4' in turn comprises a head connected to a rod, threaded or not, inserted externally through the first arm 13' and extending into the second arm 14. A guide pin 16 is also mounted in the first arm 13' for retaining the head portion when the foot portion is threaded. Thus, ejection of mechanical elements following breaking is avoided. It goes without saying that the screw could be blocked other than by guide pin, for example by virtue of its thread.

Figure 9A:
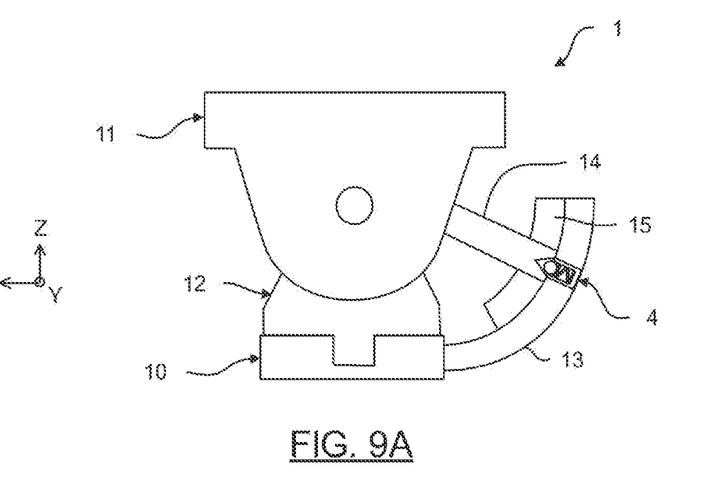
FIG. 9A is a schematic representation in a longitudinal cross-section view of the protection device according to another embodiment of the invention.
Figure 9B:
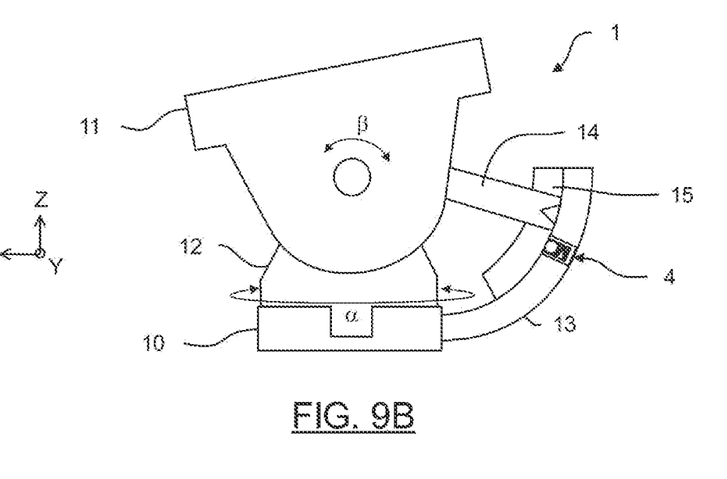
FIG. 9B is a schematic representation in a longitudinal cross-section view of the protection device of FIG. 9A after implementing the protection method of FIG. 5.

FIGS. 9A and 9B illustrate another embodiment of the invention wherein the retaining member 4 comprises a spring-loaded plunger with a ball. In the absence of or below a predetermined unbalance force, the spring keeps the ball in an extended position in a housing formed in the second arm 14. In the presence of a predetermined unbalance force, the ball is moved into a retracted position in the first arm 13 by compressing the spring, thereby releasing the second arm 14 and thus the nacelle 6.

Alternatively, the mechanical spring of the retaining member 4 could be replaced by a permanent magnet mounted to the second arm 14 so as to keep the ball in an extended position and release it under a pre-set force level corresponding to the predetermined unbalance force.

It goes without saying that the embodiments described are not independent but can be combined for all or part of the elements described.

Figure 10A:
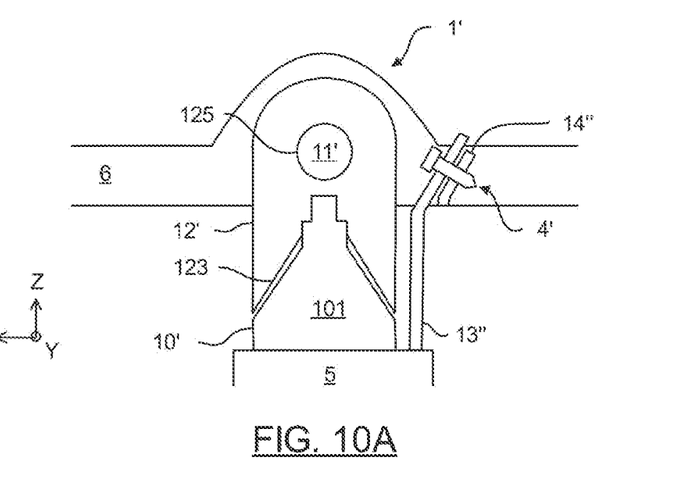
FIG. 10A is a schematic representation in a longitudinal cross-section view of the protection device according to an alternative embodiment of the invention.
Figure 10B:
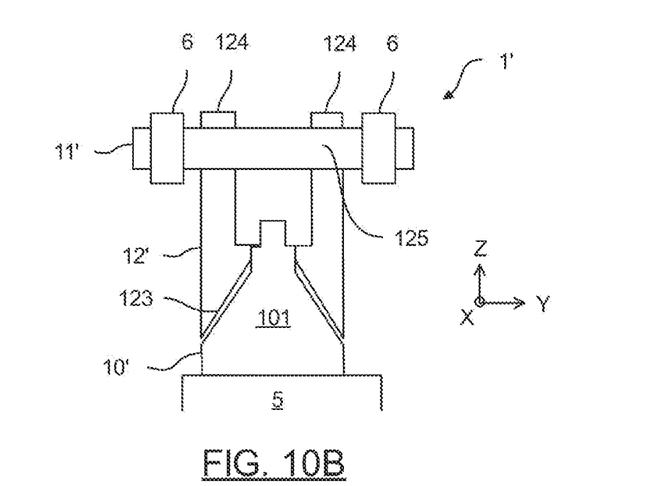
FIG. 10B is a schematic representation in a front view of the protection device of FIG. 10A.
Figure 10C:
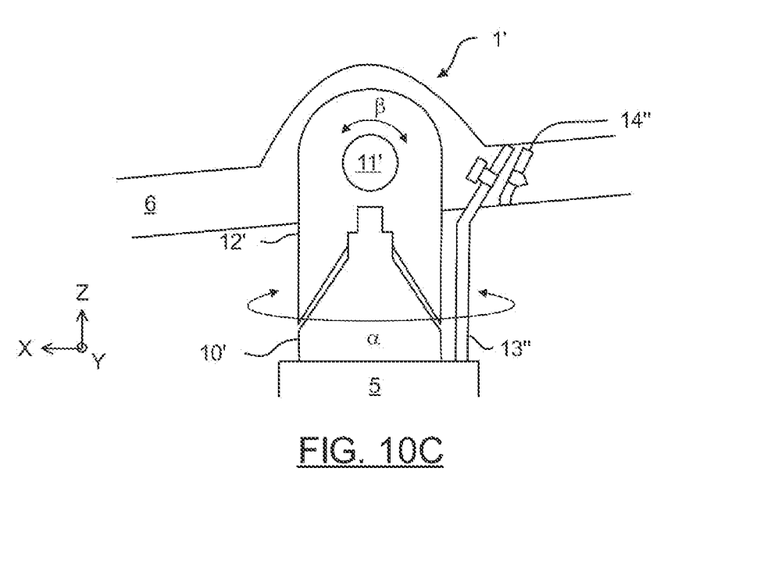
FIG. 10C is a schematic representation in a longitudinal cross-section view of the protection device of FIG. 10A after implementing the protection method of FIG. 5.

FIGS. 10A to 10C illustrate another embodiment of the invention which differs from the preceding ones in that the interface member 12' cooperates with the first connecting member 10' and the second connecting member 11', each forming the female part of the connection. In this embodiment, the first arm 13" and the second arm 14" are moreover directly attached to the mast 5 and the nacelle 6 respectively.

More precisely, as illustrated in FIGS. 10A and 10B, the first connecting member 10' comprises a rod 101 projectingly extending along the longitudinal axis Z and cooperating with an opening 123 along the longitudinal axis Z of the interface member 12'. The rod 101 and the opening 123 each comprise a frustoconical portion so as to facilitate cooperation. Preferably, a connecting ring (not represented) is also inserted between the rod 101 and the opening 123 to promote cooperation.

Still referring to FIGS. 10A and 10B, the second connecting member 11' is in the form of a pivot with a transverse axis Y attached to the nacelle 6 at its ends. The interface member 12' is in the form of a yoke and comprises two lugs 124 extending along the longitudinal axis Z and each comprising a through opening 125 of transverse axis Y. The second connecting member 11' extends into the two through openings 125 in order to allow rotation about the transverse axis Y.

With reference to FIG. 10A, the second arm 14" is attached to the nacelle 6 and comprises a spherical interface so as to cooperate with the first arm 13'. The spherical interface is preferably mounted as an insert to the second arm 14" to facilitate machining and integration. Preferably, the first arm 13' is itself in the form of an insert mounted to the mast 5. The attachment of the first arm 13 directly to the mast 5 and of the second arm 14 directly to the nacelle 6 advantageously contribute to an optimal hold.

With reference to FIG. 10C, in the presence of an unbalance, the standby protection device 1' once released allows the nacelle 6 to rotatably move in the same degrees of freedom α, β as before, namely in rotation about the longitudinal axis Z and about the transverse axis Y. In all the embodiments described, the degree of freedom α is allowed by the connection between the first connecting member 10, 10' and the interface member 12, 12' while the degree of freedom β is allowed by the connection between the second connecting member 11, 11' and the interface member 12, 12'. It goes without saying, however, that it could also be inversely. The configuration of the embodiments described above advantageously increases robustness and mechanical strength of the mast 5.

The invention also relates to a method for protecting the mast 5 of a propulsive assembly 9, such as those described in the preceding embodiments. Prior to the implementation of the method, as illustrated in FIGS. 3, 4, 8A, 9A, 10A and 10B, the retaining member 4, 4' keeps the second connecting member 11, 11' fixed with respect to the first connecting member 10, 10'. In other words, the protection device 1, 1' is initially mounted in standby and forms a fixed connection between the propulsion device S and the mast 5, in the previous examples between the nacelle 6 and the mast 5.

As illustrated in FIG. 5, the method is implemented when a predetermined unbalance force is applied to the propeller 8, such as in case of blade loss due to contact with a bird in flight for example. The predetermined unbalance force is chosen to be sufficiently high so as not to implement the protection method in an untimely manner, and sufficiently low so as to implement the protection method as soon as the unbalance occurs, without delay or waiting that could damage the mast 5.

Thus, as illustrated in FIGS. 6, 7, 8B, 9B and 10C, in the presence of such an unbalance force, the retaining member 4, 4' releases the standby protection device 1, 1', for example by shear breaking of a pin or screw or by movement of a ball by a spring or magnet in the preceding embodiments. The propulsion device S is then allowed to rotatably move with respect to the mast 5 in the degrees of freedom α, β offered by the connections of the protection device 1, 1'. This advantageously makes it possible to absorb some of the forces generated by the unbalance on the propulsive assembly 9, in order to avoid transmitting them to the mast 5. The mast 5 is thus advantageously protected in particular against the forces or moments of torsion which are very harmful for a slender mast with a small cross-section area, which increases its service life and avoids the appearance of brittleness, especially at its ends. The propulsion is assured while guaranteeing safety. Advantageously, oscillations of the engine 7 are partly absorbed by the standby protection device 1, 1' once released, which avoids transmission of forces to the base of the mast 5.

The invention thus makes it possible to enhance mechanical strength of the mast 5, in particular of great slenderness, without having to modify its dimensions in order to integrate shock absorbers and/or to make a compromise on the performance of the propulsive assembly 9. Indeed, the standby protection device 1, 1' advantageously comprises a small overall size and a low mass, which makes it easy to integrate. Such a standby protection device 1, 1' forms a safety device which can be activated only when necessary by virtue of the retaining member 4, 4'. Activation is moreover simple, fast and without human intervention for immediate protection.

The invention claimed is:

1. A propulsive assembly comprising a mast and a propulsion device supported by the mast, said propulsion device comprising an engine and a nacelle wrapping the engine, said engine comprising a propeller rotatable along an axis of rotation driven by the engine, the propulsive assembly comprising:
    a standby protection device comprising a first connecting member fixedly mounted to the mast and a second connecting member fixedly mounted to the propulsion device, the second connecting member being rotatably hinged with respect to the first connecting member with at least two degrees of freedom, and
    a single retaining member keeping the second connecting member fixed with respect to the first connecting member, said single retaining member being configured, in the presence of a predetermined unbalance force on the propeller, to release the at least two degrees of freedom of the standby protection device in order to protect the mast.

2. The propulsive assembly according to claim 1, wherein the second connecting member is fixedly mounted to the nacelle of the propulsion device.

3. The propulsive assembly according to claim 1, wherein the standby protection device comprises an interface member mounted between the first connecting member and the second connecting member, said interface member being pivotally mounted with respect to the first connecting member in one of the degrees of freedom, said second connecting member being pivotally mounted with respect to the interface member in another of the degrees of freedom.

4. The propulsive assembly according to claim 1, wherein one degree of freedom is in the form of a rotation about the longitudinal axis of the mast.

5. The propulsive assembly according to claim 1, wherein a degree of freedom is in the form of a rotation about a transverse axis, which defines an orthogonal reference frame with the axis of rotation of the propeller and the longitudinal axis of the mast.

6. The propulsive assembly according to claim 1, wherein the single retaining member is configured to passively release the protection device under the effect of the predetermined unbalance force.

7. The propulsive assembly according to claim 1, wherein the standby protection device comprises a first arm integral with the mast and a second arm integral with the propulsion device, the single retaining member connecting the first arm to the second arm.

8. The propulsive assembly according to claim 1, wherein the mast comprises a slenderness greater than 5, wherein the slenderness is defined as the quotient of length of the mast to its chord.

9. A method for protecting the mast of the propulsive assembly according to claim 1, wherein the first connecting member and the second connecting member are initially kept fixed by the single retaining member, in which method, in the presence of a predetermined unbalance force on the propeller, the single retaining member releases the standby protection device in order to protect the mast.

10. A propulsive assembly comprising a mast and an engine having a nacelle wrapping the engine and a propeller rotatable along an axis of rotation driven by the engine, the propulsive assembly comprising:
- a standby protection device comprising a first connecting member fixedly mounted to the mast and a second connecting member fixedly mounted to the engine, the second connecting member being rotatably hinged with respect to the first connecting member with at least two degrees of freedom,
- a retaining member fixes the first and second connecting members from relative movement with respect to one another in a fixed state of the retaining member and the retaining member is an unfixed state to release the at least two degrees of freedom of the standby protection device when a predetermined unbalance force on the propeller is reached; and
- wherein the retaining member projects between the first and second connecting members in the fixed state and wherein the retaining member is biased by the predetermined unbalance force on the propeller or is broken by the predetermined unbalance force on the propeller in the unfixed state.

11. The propulsive assembly according to claim 10, wherein the second connecting member is fixedly mounted to the nacelle of the propulsion device.

12. The propulsive assembly according to claim 10, wherein the standby protection device comprises an interface member mounted between the first connecting member and the second connecting member, said interface member being pivotally mounted with respect to the first connecting member in one of the at least two degrees of freedom, said second connecting member being pivotally mounted with respect to the interface member in a second of the at least two degrees of freedom.

13. The propulsive assembly according to claim 10, wherein one degree of freedom of the at least two degrees of freedom is a rotation about the longitudinal axis of the mast.

14. The propulsive assembly according to claim 10, wherein one degree of freedom of the at least two degrees of freedom is a rotation about a transverse axis, which defines an orthogonal reference frame with the axis of rotation of the propeller and the longitudinal axis of the mast.

15. The propulsive assembly according to claim 10, wherein the retaining member is configured to passively release the protection device under the effect of the predetermined unbalance force.

16. The propulsive assembly according to claim 10, wherein the standby protection device comprises a first arm integral with the mast and a second arm integral with the propulsion device, the retaining member connecting the first arm to the second arm.

17. The propulsive assembly according to claim 10, wherein the mast comprises a slenderness greater than 14, wherein the slenderness is defined as the quotient of length of the mast to its chord.

18. A method for protecting the mast of the propulsive assembly according to claim 10, wherein the first connecting member and the second connecting member are initially kept fixed by the retaining member, in which method, in the presence of a predetermined unbalance force on the propeller, the retaining member releases the standby protection device in order to protect the mast.

* * * * *